United States Patent [19]

Pickell

[11] Patent Number: 4,799,400
[45] Date of Patent: Jan. 24, 1989

[54] SELF-ADJUSTING CABLE CONTROL DEVICE

[75] Inventor: John M. Pickell, Highland, Mich.

[73] Assignee: Acco Babcock Inc., Fairfield, Conn.

[21] Appl. No.: 120,721

[22] Filed: Nov. 6, 1987

Related U.S. Application Data

[63] Continuation of Ser. No. 832,526, Feb. 21, 1986, abandoned.

[51] Int. Cl.$^4$ .............................................. F16C 1/10
[52] U.S. Cl. ............................. 74/502.6; 192/111 A; 192/70.25; 188/196 B
[58] Field of Search ........ 74/501.5 R, 500.5, 501.5 H, 74/501.6, 502, 502.4, 502.6; 192/111 A, 70.25, 30 W; 188/196 P, 196 B, 196 V

[56] References Cited

U.S. PATENT DOCUMENTS

| | | | |
|---|---|---|---|
| 2,884,097 | 4/1959 | Stultz et al. | 74/501.5 R |
| 2,957,354 | 10/1960 | Morrow | 74/501.5 R |
| 3,572,159 | 3/1971 | Tschanz | 74/501.5 R |
| 4,177,691 | 12/1979 | Fillmore | 74/501.5 R |
| 4,344,518 | 8/1982 | Gilmore | 192/111 A |
| 4,464,950 | 8/1984 | Deligny | 74/501.5 R |

FOREIGN PATENT DOCUMENTS

| | | | |
|---|---|---|---|
| 0120616 | 10/1984 | European Pat. Off. | 74/501.5 R |
| 3305417 | 6/1984 | Fed. Rep. of Germany | 74/501.5 R |
| 57-80959 | 5/1982 | Japan | 74/501.5 R |
| 8300225 | 3/1984 | PCT Int'l Appl. | 74/501.5 R |
| 2088502 | 6/1982 | United Kingdom | 74/501.5 R |
| 2157789 | 10/1985 | United Kingdom | 74/501.5 R |

Primary Examiner—Richard E. Moore
Assistant Examiner—Vinh Luong
Attorney, Agent, or Firm—Barnes, Kisselle, Raisch, Choate, Whittemore & Hulbert

[57] ABSTRACT

A self-adjusting cable control device for automatically compensating for wear in a control cable system. The device includes a termination member connected at one end of a control cable and a connecting member attached to an actuation member. The connecting member carries a clutch for locking with the termination member upon application of force to the actuation member. Spring means are provided to move the cable with respect to the actuation member when the clutch is disengaged from the termination member. The clutch comprises a plurality of collet members which are movable radially and longitudinally and surround the termination member. The collet members have conical surfaces at one end adapted to engage complementary conical surfaces on the connecting member and serrations which engage complementary serrations on the collet members. The control device further includes a release tube that is accessible from the exterior of the device and can be engaged and moved axially inwardly by a clip to disengage the collet members and thereby permit easy connection of the device to the cables. In addition, provision is made for a separate clip normally holding the tube in a position and operable to release the release tube and the collet members to operative position.

10 Claims, 2 Drawing Sheets

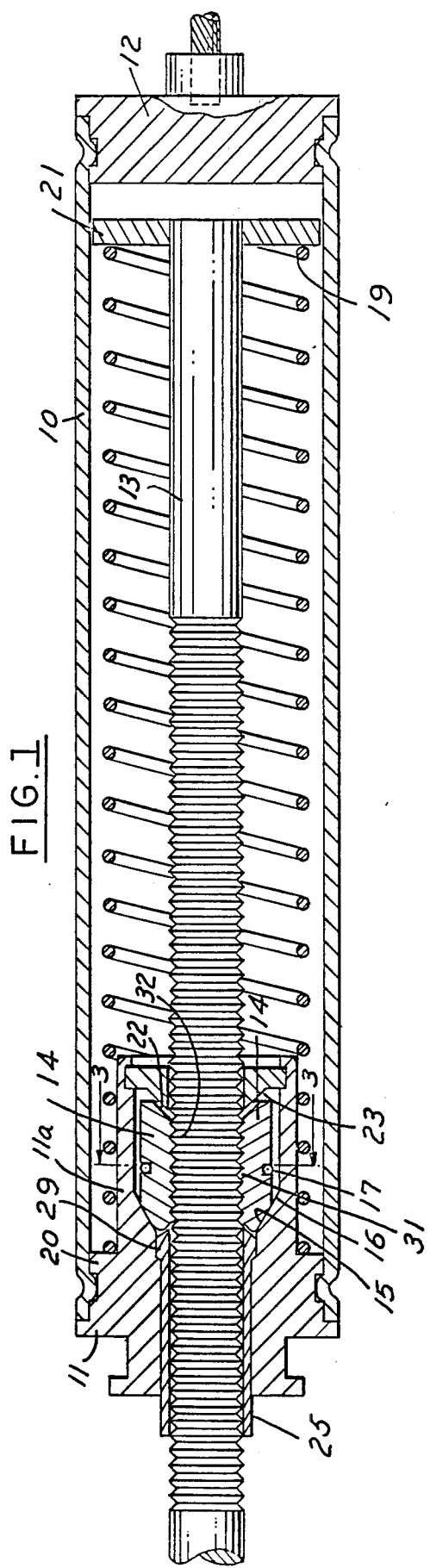
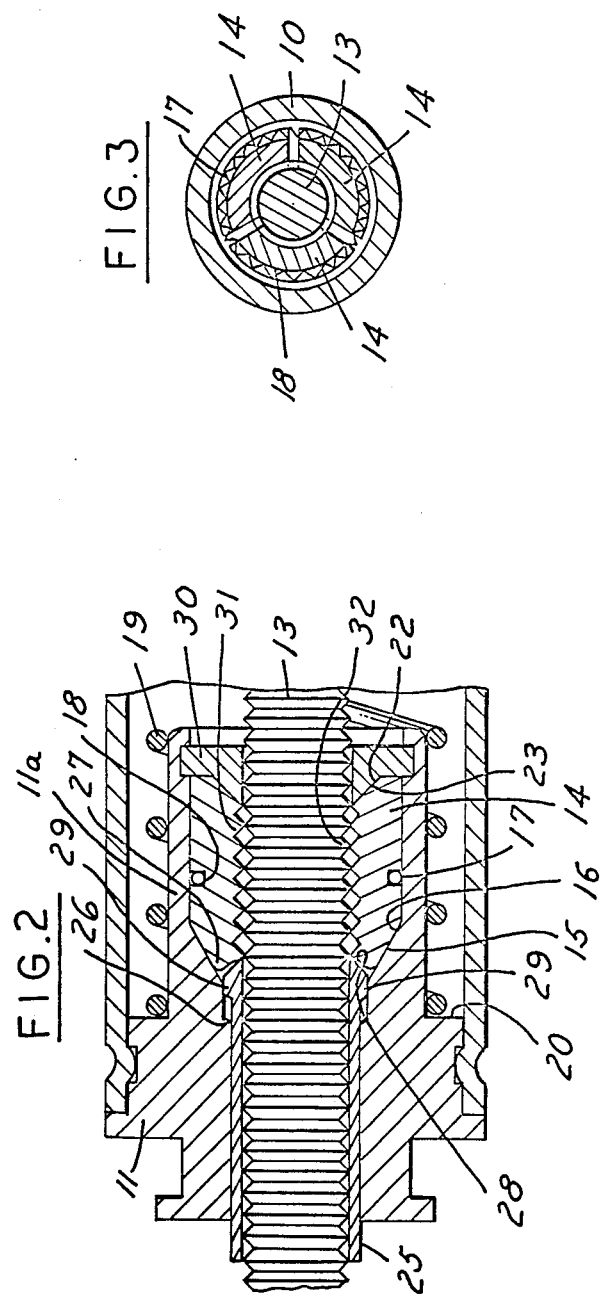

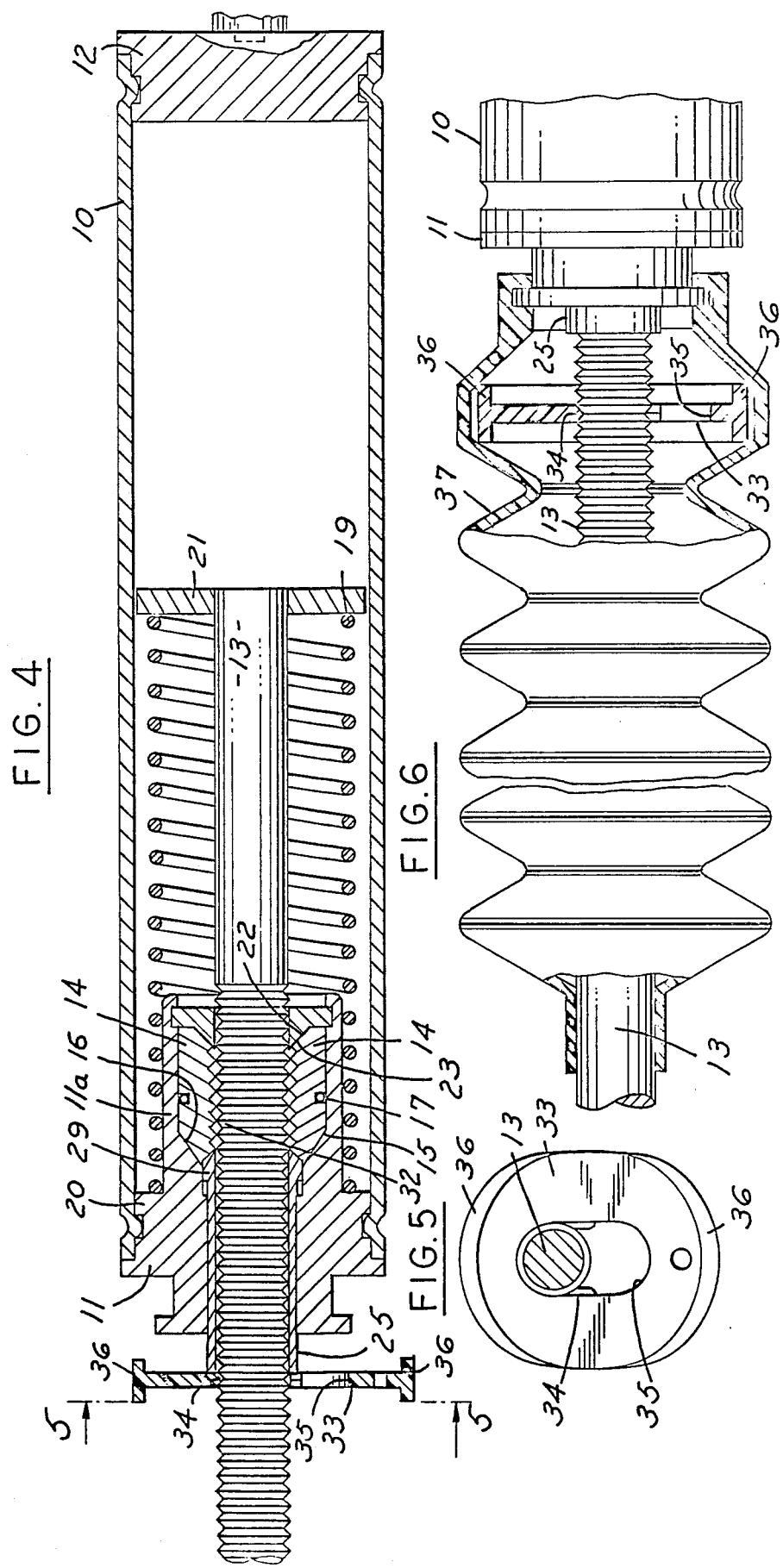

SELF-ADJUSTING CABLE CONTROL DEVICE

This application is a continuation, of application Ser. No. 832,526, filed Feb. 21, 1986 now abandoned.

The invention relates to a self-adjusting cable control device which will automatically compensate for wear in a control cable system to insure that proper tension and tolerances are maintained in the system.

BACKGROUND AND SUMMARY OF THE INVENTION

Cable operated controls are utilized in a number of control systems. For example, a clutch mechanism in a manual shift automobile is often connected by means of a flexible control cable to a clutch pedal mounted on the fire wall separating the engine compartment from the passenger compartment. In addition, flexible control cables are often utilized in brake systems where a brake is connected by means of a flexible control cable to a brake pedal also mounted on a fire wall.

The control cables in such systems often require adjustment in order to accommodate manufacturing tolerances in the cable itself or in the controlled member operated by the cable. Further adjustment may be required after a period of use to accommodate wear in the cable and attachments including sheaves or in the member controlled by the cable.

For example, in a manual shift system, the clutch mechanism facing plate wears during use resulting in the relatively heavy clutch spring drawing the control cable further towards the clutch mechanism and effectively shortening the cable whereby play will be introduced between the clutch pedal and the control cable. In brake systems, the opposite result occurs, that is, the effective length of the cable is lengthened as a result of the cables and attaching brackets taking a permanent deflection after a load is applied, again resulting in undesirable slack in the cables.

Such cable controls systems can be adjusted manually to achieve the desired regulation but this usually requires shutting down of the system (in the case of an automobile, taking it to a garage) and obtaining the services of a mechanic.

Various structures have been proposed in the past to provide for a self-adjusting feature to assure proper tensioning of a control cable in a control system. Such devices have, however, been expensive to manufacture and often took up an undue amount of space in the engine compartment is limited and it is often difficult to provide space between the fire wall and a member to be controlled in which to position any self-adjusting control device.

In U.S. Pat. No. 4,378,713, there is disclosed and claimed a self-adjusting control cable device including a termination member which is adapted to be connected to the end of a cable extending to a controlled member such as a manual gear shift clutch mechanism or brake. The device also includes a connecting member adapted to connect with a flexible cable or rod leading to an actuation member such as a brake or clutch pedal. A main housing surrounds the termination and connecting members. A first spring is included for urging the termination member towards the connecting member and a second spring is included for urging the connecting member towards the termination member. A clutch means is carried by the connecting member and is adapted to engage and lock with the termination member when the connecting member is moved against the force of the second spring means by the actuation member. Engagement and locking of the clutch with the termination member will then pull the control cable to actuate the controlled member. When force is released from the actuation member, the second spring will move the connecting means and clutch means towards the termination member allowing the clutch means to disengage from the termination member. The termination member and control cable are then free to move with respect to the connecting means to accommodate for any wear in the system. Thus, in a brake system, the termination end will be urged to move towards the connecting member by the force of the first spring to take up any slack in the control cable. In the case of a clutch mechanism in a manual gear shift system, the termination end will be free to move away from the connecting member under the force of the heavy clutch spring of the clutch mechanism.

The main housing may be anchored to a wall, such as a fire wall separating the engine and operator compartments of a vehicle, or the device may be anchored between cable conduits extending between the controlled member and the fire wall.

In one form shown in U.S. Pat. No. 4,378,713, the clutch means comprises an annular collar which fits loosely around the termination member and which has an ear fitting into a slot in the connecting member. As the connecting member is moved away from the termination member, the annular collar will tilt such that its inside periphery will engage and lock with the termination member. Both the inside periphery of the annular collar and the outside surface of the termination member may have serrated surfaces to better insure a locking engagement between the two parts.

In another form shown in U.S. Pat. No. 4,378,713, the connecting member comprises a circular housing and the clutch means comprises at least one radially movable collet piece carried by the connecting member. The connecting member has a tapered surface adapted to engage the collet piece and move it radially inwardly of the termination piece when the connecting member is moved away from the termination member by a force being applied to an actuation member. A third spring means is operatively positioned between the collet piece and the circular housing to urge the collet piece to a locked position with respect to the termination member. A stop is provided in the main housing to limit movement of the circular housing towards the termination member under the force of the second spring means and to also limit movement of the collet piece.

When the self-adjusting take up feature is utilized in connection with parking brake systems, the requirements become more stringent.

Federal Department of Transportation requires that all automobiles have a mechanical parking brake system capable of holding the vehicle on a 30% grade. Parking brake systems generally use a ratchet lock, hand or foot lever to apply a tension load to the rear brake shoes or pads. This load is usually transmitted by strand in a flexible conduit.

Proper adjustment at assembly line level has always been a problem for automotive manufacturers. Devices to impose a heavy load at time of initial adjustment are commonly used. The system will get out of adjustment if: the strand takes a permanent set from extension under load—the conduits shorten because of compression set—the swaged terminations slip on the strand—or the conduits seats in their respective anchorages.

Transporting the cars on carriers with the brake system under heavy loads and use by the owner after delivery may cause the system to get out of adjustment with high warranty cost to the manufacturer for manual adjustment by the dealer.

It is an objective of the present invention to provide an improved control device to automatically impose a predetermined tension load at assembly line level. This loading is accomplished by the stored energy in the integral compression spring. Also of great importance is the continuing selfadjusting feature that compensates for stretch of strandcompressive set of conduits-slippage of terminations and seating of all of the system components. This provides for long life properly adjusted parking brake system without any manual maintenance.

Among the further objectives of the invention are to provide a self-adjusting cable control device for automatic brake adjustment which is lower in cost, requires lower tooling cost, has improved ability for application to a wide range of vehicles that require special packaging considerations in the vehicle interior, is easily and safely installed in the vehicle assembly plant, and is easy to service in the field due to the ease of accessibility.

Further objectives are to provide such a selfadjusting cable control device which includes a quick release feature that facilitates installation, servicing and replacement, which can be safely locked for shipment to the vehicle assembly plant, which is shorter in length and width permitting installation in vehicles with little available space and reducing the overall mass subjected to vibration and resultant noise from contact with adjoining vehicle services.

In accordance with the invention, a self-adjusting cable control device for automatically compensating for wear in a control cable system includes a termination member connected at one end of a control cable and a connecting member attached to an actuation member. The connecting member carries a clutch for locking with the termination member upon application of force to the actuation member. Spring means are provided to move the cable with respect to the actuation member when the clutch is disengaged from the termination member. The clutch comprises a plurality of collet members which are movable radially and longitudinally and surrounds the termination member. The collet members have conical surfaces at one end adapted to engage complementary conical surfaces on the connecting member and serrations which engage complementary serrations on the collet members. The control device further includes a release tube that is accessible from the exterior of the device and can be engaged and moved axially inwardly by a clip to disengage the collet members and thereby permit easy connection of the device to the cables. In addition, provision is made for a separate clip normally holding the tube in a position and operable to release the release tube and the collect members to operative position.

DESCRIPTION OF THE DRAWINGS

FIG. 1 is a longitudinal sectional view of a selfadjusting cable control device embodying the invention.

FIG. 2 is a view of an enlarged portion of the device showing the device in a different operative position.

FIG. 3 is a sectional view taken along the line 3-3 in FIG. 1.

FIG. 4 is a fragmentary sectional view of a portion of the device shown in FIG. 1 showing the device in position for attachment to cables.

FIG. 5 is a sectional view taken along the line 5-5 in FIG. 4.

FIG. 6 is a fragmentary part sectional view similar to FIG. 4 showing a shroud or boot on the device.

DESCRIPTION

Referring to FIGS. 1-3, the self-adjusting cable control device embodying the invention is adapted to be interposed between brake cables not shown. The device comprises a connecting member in the form of a tubular housing 10 having its ends closed by members 11, 12. Connecting member 10 is adapted to be connected as by a cable to an activating member such as a clutch or brake. Portions of housing 10 are crimped into grooves on members 11, 12 to hold the members 11, 12 in position. A termination member 13 in the form of a rod extends through an opening in the end member 11 and is connected to one cable in any suitable manner such as a conventional attaching clip.

A clutch is provided and includes collet members 14 positioned about the termination member 13 within the tubular portion 11a of member 11. The collet members 14 have external conical surfaces 15 at one end adapted to engage a complementary internal conical surface 16 on the end member 11. A circular retaining spring 17 extends circumferentially in aligned grooves 18 in each collet member 14 to yieldingly urge the collet members 14 toward the termination member 13. A helical spring 19 is interposed between an abutment or shoulder 20 on the end member 11 and a washer 21 fixed on the end of the termination member 13 yieldingly urging the termination member 13 inwardly of the housing 10 an to the right as seen in FIG. 1. As shown in FIG. 1, the collet members 14 include an internal conical surface 22 at the end thereof opposite the end having surfaces 15. Surfaces 15 are complementary to an external generally frustoconical surface 23 on a washer 30 on portion 11a of end members 11. The interengagement of the internal and external conical surface of the collet members with the internal surfaces of the end member 11 and external surface 23 of washer 30 is such that the collet members disengage over the complete length of the serrations.

The angle which the surfaces 15 on the collet 14 members 14 make with the axis of the housing 11 is slightly greater than the angle which the conical surface 16 makes with the axis of housing 11.

The device further includes a release tube 25 that extends through the end member 11 and surrounds the termination member 13. The release tube 25 includes an enlarged inner end 29 that engages a shoulder 26 on the end member 11 retaining the tube 25 against axially outward movement. The release tube 25 is operated by engagement with a clip 33 to urge the collets 14 to the right as viewed in FIG. 1 to the position shown in FIG. 2, thereby disengaging the collets 14 and permitting disassembly or adjustment of the device. The end of each collet 14 nearest the release tube 25 is formed with a frustoconical surface 27 that extends radially and axially inwardly from the end nearest the tube 25. Serrations 31, 32 on the collet members 14 and termination member 13 are preferably annular and symmetrical in the form of teeth which have a triangular cross section preferably with an included angle of ninety degrees (90°). The surfaces 27 are engaged by a complementary frustoconical surface 28 on the enlarged end 29 of the release tube 25 to force the collets 14 radially outwardly and cause the serrations 31 on the collets to disengage from the serrations 32 on the terminal member 13. Washer 30 is fixed on end member 11 by crimping and limits inward axial movement of collet members 14 and thus becomes portion of the connecting member 10.

When an adjustment needs to occur because of slack, the spring 19 urges the termination member 13 to the right causing surfaces 22 on the collet members 14 to engage the surface 23 on washer 30. This, in combination with the normal component of force acting on teeth 31 resulting from teeth 32 on termination member 13, forces the collet members 14 to move radially outwardly disengaging the teeth 31, 32 until the slack is removed and the teeth re-engage.

Clip 33 is provided to lock termination member 13 in the full out position (to the left in FIG. 1) to allow connection of the separate cables during assembly. Clip 33 is preferably made of plastic and comprises an enlarged opening having an upper narrow portion 34 engaging the teeth 32 and a lower wider portion 35. clip 33 is also provided with opposed flat portions 36 extending axially of the device. A tubular shroud or boot 37 of elastic material surrounds the clip 36 and provides a seal against dirt, oil and the like. When it is desired to release the device after it is mounted on the automobile, the installer disengages the clip 33 by pressing on the flat finger engaging portions 36 through the shroud 37 and moving the clip upwardly as from the position in FIG. 5. Disengagement of the clip releases the tube 25 to allow removal of slack in the cables after the mechanism is in position on the vehicle.

It can thus be seen that the resultant self-adjusting cable control device is lower in cost, requires lower tooling cost, has improved ability for application to a wide range of vehicles that require special packaging considerations in the vehicle interior, is easily and safely installed in the vehicle assembly plant, and is easy to service in the field due to the ease of accessibility.

I claim:

1. A self-adjusting automatically compensating cable control device in a control cable system comprising
   a termination member adapted to be connected at one end of a control cable and having longitudinally spaced serrations on the exterior thereof,
   a connecting member adapted to be attached to an actuation member,
   a plurality of collet members having longitudinally spaced serrations thereon normally engaging the serrations on said termination member,
   spring means interposed between said termination member and said connecting member for moving the termination member longitudinally relative to the connecting member when the collet members are disposed from the termination member,
   said connecting member having a portion forming an internal conical surface and a portion having an external conical surface,
   said internal conical surface and said external conical surface on said connecting member being spaced longitudinally from one another in fixed relation on said connecting member,
   said collet members being positioned longitudinally between said internal conical surface and external conical surface on said connecting member,
   said collet members being movable radially outwardly to disengage the serrations on the collet members from the serrations on the termination member over the complete length of the serrations on the collet members,
   said collet members having external conical surfaces adapted to engage said internal conical surface on the connecting member for engaging the serrations on the collet members with the serrations on the termination member,
   the axial length of each said collet member between the external conical surface and internal surface thereon being less than the axial distance between said internal surface and said external surface on said connecting member,
   said collect members having internal conical surfaces adapted to engage said external conical surface on the connecting member for disengaging the serrations on the collect members from the serrations on the termination member,
   said collet members being movable longitudinally between a first position wherein the external surfaces of said collet members are in engagement with the internal surface of said connecting member and a second position wherein said internal surfaces of said collect members are in engagement with said external surface on said connecting member
   said collet members being in said first position wherein the internal surface of said connecting member and the external surfaces of said collet members are in engagement and with said serrations on said collet members in normal engagement with said serrations on said termination member when there is an external actuation force on said termination member and when the force on said termination member is reduced below a predetermined amount, said spring means acting on said termination member causes said termination member to move said collet members longitudinally to bring the collet members to said second position and cause said internal conical surfaces on said collet members to engage the external conical surface on said connecting member forcing the collet members to move radially outwardly and disengaging the serrations over the complete length of the serrations on said collet members from the serrations on the termination member allowing the spring means to move the termination member axially relative to the collet member and the connecting member until the force on the termination member is re-established to a predetermined amount.

2. The control device set forth in claim 1 wherein said complementary internal conical surface of said connecting member form a slightly lesser angle with the axis of said termination member than the respective external conical surface on said collet members.

3. The self-adjusting cable control set forth in claim 1 including a circular retaining spring, said collet members having aligned circumferentially extending grooves in which said retaining spring is positioned, said spring being positioned in circumferentially aligned grooves on said collet members, said grooves being positioned longitudinally between the conical surfaces on on said collet members.

4. The self-adjusting cable control device set forth in claim 1 including a release tube mounted on said connecting member and extending inwardly of said connecting member and having an inner end adjacent said collets, said release tube being inoperative during normal operation of said automatically compensating control device, said release tube being accessible from the exterior of said connecting member and operable when manually moved axially inwardly to cause the inner end of the tube to disengage the collet members and release the serrations on said collet members from engagement with said serrations on said termination member.

5. The control device set forth in claim 4 wherein said release tube includes an enlarged end which engages said collet members.

6. The self-adjusting cable control device set forth in claim 1 including a disengageable clip normally disengaged from the serrations on said termination member during normal operation of said automatically compensating cable control device, said clip being adapted to be moved manually to engage said serrations on said termination member to lock said termination member relative to the connecting member during shipment or handling, said clip being accessible from the exterior of the device after it is installed in a system so that it can be manually disengaged.

7. The control device set forth in claim 6 wherein each of said collet members includes a frustoconical surface which extends radially and axially inwardly and is adapted to be engaged by said enlarged end of said release tube when said tube is moved axially inwardly.

8. The self-adjusting cable control device set forth in claim 6 wherein said clip includes opposed finger engaging portions extending axially of said termination member for grasping and moving the clip radially out of engagement.

9. The self-adjusting cable control device set forth in claim 8 including a flexible tubular shroud on said device surrounding said clip and a portion of the termination member extending axially outwardly, said shroud being made of sufficiently flexible material such that said clip can be disengaged by grasping the shroud and the clip on the areas of said finger engaging portions.

10. A self-adjusting automatically compensating cable control device in a control cable system comprising
   a termination member adapted to be connected at one end of a control cable and having longitudinally spaced serrations on the exterior thereof,
   a connecting member adapted to be attached to an actuation member,
   a plurality of collet members having longitudinally spaced serrations thereon normally engaging the serrations on said termination member,
   spring means interposed between said termination member and said connecting member for moving the termination member longitudinally relative to the connecting member when the collet members are disengaged from the termination member,
   said connecting member having a portion forming an internal conical surface and a portion having an external conical surface spaced longitudinally from one another,
   said collet member being positioned longitudinally between said internal conical surface and external conical surface on said connecting member,
   said collet members being movable radially outwardly to disengage the serrations on the collet members from the serrations on the termination member over the complete length of the serrations on the collet members,
   said collet members having external conical surfaces adapted to engage said internal conical surface on the connecting member for engaging the serrations on the collet members with the serrations on the termination member,
   said collet members having internal conical surfaces adapted to engage said external conical surface on the connecting member for disengaging the serrations on the collet members form the serrations on the termination member,
   said collet members being in said first position wherein the internal surface of said connecting member and the external surfaces of said collet members are in engagement and with said serrations on said collet members in normal engagement with said serrations on said said termination member when there is an external actuation force on said termination member and when the force on said termination member is reduced below a predetermined amount, said spring means acting on said termination member causes said termination member to move said collet members longitudinally to bring the collet members to said second position and cause said internal conical surfaces on said collet members to engage the external conical surface on said connecting member forcing the collet members to move radially outwardly and disengaging the serrations over the complete length of the serrations on said collet members from the serrations on the termination member allowing the spring means to move the termination member axially relative to the collet members and the connecting member until the force on the termination member is re-established to a predetermined amount,
   said connecting member comprising a tubular housing having end members, one of said end members having an inwardly axially extending portion surrounding the collet members and spaced from said tubular housing to define a space between said tubular housing and said axially extending portion, said spring means comprising a coil spring, one end of said spring extending into the space between said tubular housing and said axially extending portion, said axially extending portion defining said longitudinally spaced internal surface and external conical surface of said connecting member.

* * * * *